United States Patent [19]
Schallis

[11] 3,936,534
[45] Feb. 3, 1976

[54] PROCESS FOR PRODUCING FREE FLOWING PARTICULATE SULFUR

[75] Inventor: Alvin H. Schallis, Irvington, N.Y.

[73] Assignee: Stauffer Chemical Company, Westport, Conn.

[22] Filed: June 18, 1973

[21] Appl. No.: 371,006

[52] U.S. Cl. ............... 427/215; 427/242; 427/299; 427/398
[51] Int. Cl.² ...................... B05D 7/00; B05D 3/12
[58] Field of Search ............ 264/117; 427/215, 242, 427/299, 301, 343, 398

[56] References Cited
UNITED STATES PATENTS

| | | | |
|---|---|---|---|
| 2,436,771 | 2/1948 | Hood | 264/15 |
| 3,278,276 | 10/1966 | Pellens et al. | 264/117 |
| 3,760,050 | 9/1973 | Blaker et al. | 264/117 |

*Primary Examiner*—Robert F. White
*Assistant Examiner*—J. R. Hall

[57] ABSTRACT

The invention is a method for freezing liquid sulfur. The method comprises introducing liquid sulfur into a tumbling bed of particulate sulfur to coat the particulate sulfur with liquid sulfur and providing a sufficient amount of water to the tumbling bed of particulate sulfur to maintain the bed temperature below the freezing point of the liquid sulfur.

By controlling the temperature of the tumbling bed, particulate sulfur containing only small amounts of moisture can be produced. The product is roughly spherical, free flowing and substantially dust free.

13 Claims, 3 Drawing Figures

PROCESS FOR PRODUCING FREE FLOWING PARTICULATE SULFUR

BACKGROUND OF THE INVENTION

The invention relates to a method for freezing or solidifying liquid sulfur or other materials that are substantially water insoluble and freeze at temperatures in the range of from about 80° to about 300° C.

Particularly, the invention is directed to production of sulfur particles that are free flowing and dust free. In particular, the method is directed to a process for producing sulfur in the form of pellets which are easy to handle and store. The process can be operated to produce pellets with low water content. More particularly, the process produces frozen sulfur in a form which minimizes the dust pollution arising from loading and handling dry bulk sulfur at producing plants and rail and ocean terminals.

Sulfur can be solidified in the form of pellets by means of prilling towers wherein droplets of sulfur are passed countercurrent to a stream of air for a sufficient length of time for the sulfur to solidify. Although the prilled sulfur is in a form which can be readily handled, the apparatus necessary to prill sulfur represents a substantial capital investment which makes the process unattractive for commercial installation.

Sulfur can also be frozen by contacting the sulfur with the surface of a chilled roll or by forming a layer of sulfur on a metal belt which carries the sulfur for a sufficient length of time for the sulfur to harden. The sulfur from these processes is in the form of lumps or flakes and is not readily flowable. The processes require considerable screening and crushing equipment to provide a material in a suitable particle size range.

U.S. Pat. No. 3,504,061 discloses a method for producing pelletized sulfur in which liquid sulfur is admitted to a turbulent body of water. The sulfur forms a small pellet and is reduced in temperature to a point below the freezing point of sulfur. The frozen sulfur is removed from the turbulent body of water and passed over a dewatering screen. If a dry pellet is required certain silicone materials are added to the water and the pellets dried. The silicone materials are necessary to overcome the tendency of the sulfur droplets to form with a narrow cone shaped depression which entraps water in the pellet. A substantially dry particle is usually required since it substantially reduces the heat required to remelt the material.

It is an object of the present invention to provide a method to freeze sulfur and other substantially water insoluble materials in the form of easily handled dust-free pellets. It is an object of the present invention to provide a process whereby substantially dry pellets can be produced. It is a further object of the present invention to provide a process which can produce substantially dry sulfur pellets utilizing relatively inexpensive equipment.

BRIEF DESCRIPTION OF THE INVENTION

According to the present invention, liquid sulfur is solidified by introducing the liquid sulfur into a tumbling bed of solid particulate sulfur to coat the particulate sulfur with the liquid sulfur and providing a sufficient amount of water to said tumbling bed of particulate sulfur to maintain the temperature of the tumbling bed below the freezing point of sulfur. The particles formed by the process are free flowing and substantially dust-free.

The amount of water which is provided to the tumbling bed of particulate sulfur can be controlled to maintain the temperature of the particulate sulfur in a temperature range above the boiling point of water or at a temperature sufficiently high that the water is substantially eliminated from the solid particles when the particles leave the freezing apparatus and are exposed to the air. The freezing apparatus can be supplied with an air stream to aid in producing a drier particle.

DESCRIPTION OF THE DRAWINGS

FIG. I is a diagrammatic elevation of an apparatus useful for producing sulfur pellets according to the process of the invention.

FIG. II is an illustration viewed from the left of a cross section of the rotating drum of FIG. I showing positioning of the liquid sulfur, water, air and particulate sulfur inlets and the form of the tumbling bed.

Figure 1:
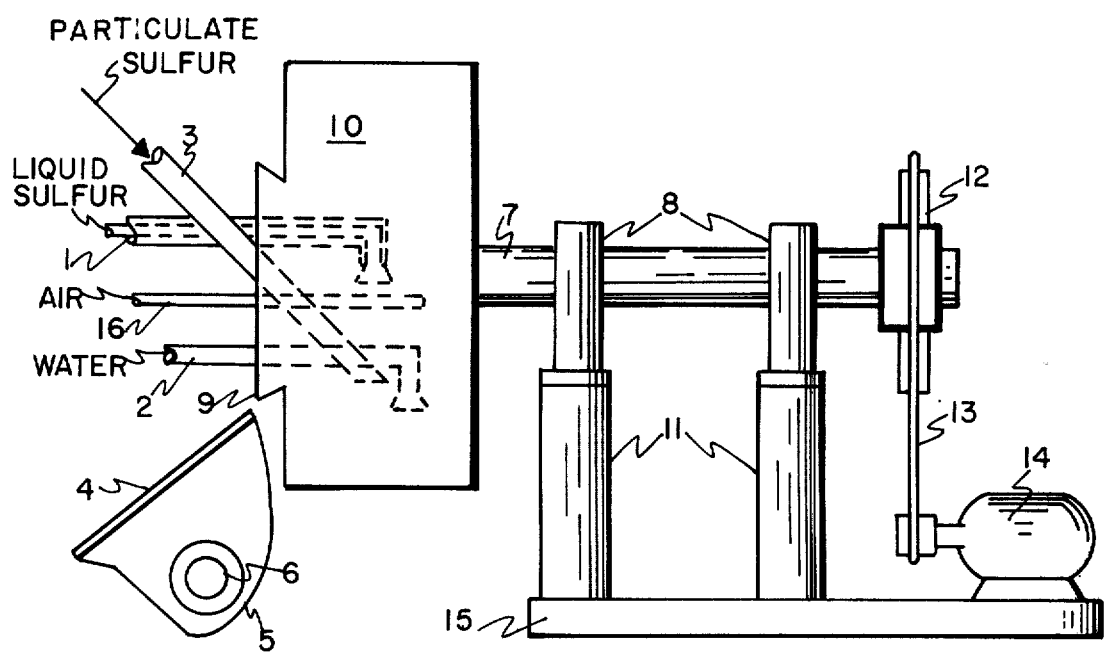

FIG. III is a diagrammatic elevation in cross section of an apparatus which can provide substantially dry pellets without the need for introducing separate particulate sulfur seed particles.

DETAILED DESCRIPTION OF THE INVENTION

In the process of the present invention, liquid sulfur is introduced into a bed of tumbling particulate sulfur. A tumbling bed refers to a bed of particulate material in which the particles are continually rolled or tumbled and in which particles from within the bed are moved to the surface. The tumbling action can be imparted to the bed in means such as a rotating drum, kiln, ribbon mixer, gas fluidized bed or the like. A preferred means for providing a tumbling bed is a rotating drum or kiln.

Liquid sulfur is introduced into the bed to coat the tumbling particles with liquid sulfur as they tumble or roll in the bed. The tumbling and rolling of the particles tends to distribute the liquid sulfur over the surface of the particles. The tumbling and rolling action of the bed continuously brings particles from the interior of the bed to the surface so the particles can be contacted with the liquid sulfur.

Liquid sulfur is frozen or solidified by maintaining the temperature of the tumbling bed below the freezing point of sulfur. At bed temperatures higher than about 2°C. below the freezing point of sulfur, the sulfur is slow to solidify, production rates are inordinately low and the liquid sulfur has an opportunity to build up on the surfaces of the apparatus used to contain the sulfur. The process can be operated at temperatures more than 70°C. below the freezing point of sulfur without difficulty. Lower temperatures increase the rate at which sulfur can be frozen; however, when the bed temperature is maintained below about 70°C., the frozen sulfur tends to become damp and remain damp when the frozen sulfur is exposed to the air on a pile. To provide a product which contains only small amounts of moisture, it is preferred to maintain the tumbling bed of particulate sulfur at a temperature above about 70°C., preferably between about 70° and about 2°C. below the freezing point of the liquid. When a substantially dry sulfur pellet is required, the bed is most preferably maintained between about 80° and about 110°C. At the lower temperatures improved results are obtained if the bed is contacted with a moving stream of air to reduce the partial pressure of water vapor in the vicinity of the particles. It is possible to control the temperature of the tumbling bed of particulate sulfur to produce product sulfur particles containing less than about 0.15% moisture by weight.

A valuable adjunct to the process is the introduction of a stream of air into the apparatus to contact the tumbling bed of particulate material. The air stream provides additional cooling and reduces the partial pressure of water vapor in the apparatus. Air introduced into the apparatus provides a drier product at a lower temperature.

The water can be provided to the tumbling bed by spray, by addition of water through an open pipe or layer of water in a rotating apparatus or by incorporation of water in damp or wet particulate sulfur feed to the tumbling bed.

The amount of water which is provided to the bed of tumbling sulfur pellets is controlled to maintain the temperature of the tumbling bed in the desired operating range. The amount of water provided to the bed is determined by the rate of addition of liquid sulfur, and the temperature range in which the bed is operated. Larger particles tend to provide lower production rates.

The process can be operated in a batch or continuous manner and can provide frozen sulfur particles in a wet or substantially dry condition.

In a batch operation, liquid sulfur can be introduced into the tumbling bed of particulate sulfur and sufficient water provided to maintain the tumbling bed within the temperature range necessary to provide a wet or dry product. When the tumbling particles achieve the required particle size range, the bed can be emptied and recharged with particulate sulfur of a size smaller than the required size of the product particles.

When the process is operated continuously, seed particles or nuclei must be provided continuously or periodically to the bed to maintain a tumbling bed of particulate sulfur within the particle size range required. If no seed particles are provided, the particles in the bed continue to increase in size and become difficult to handle.

In general, a product with particles in the range of about one-eighth inch to about 1 inch diameter can be readily produced. Particles larger than about 1 inch in diameter can be produced but the capacity of the equipment to freeze sulfur is substantially reduced since heat transfer area and area for coating with liquid sulfur becomes smaller. As the average size of the particles in the bed increases, seed particles or nuclei can be provided to the bed by addition of particulate sulfur from a source outside of the tumbling or rolling bed, or can be produced in the bed by fracture of large particles or by breaking loosely adhering coating from particles in the bed.

Normal attrition in the bed does not ordinarily provide a sufficient number of seed particles. The coated particles as formed are rather tough, resilient and resistant to fracture. The toughness, resiliency and resistance to fracture of the coated particles can be reduced by introduction of a small amount of free ammonia, in the range of about 5 to about 100 parts per million based on the weight of sulfur into the tumbling bed. The ammonia can be introduced into the tumbling bed with the water, the sulfur or in the form of a liquid or gas. Larger amounts of free ammonia can be introduced into the bed without a deleterious effect on the process but involves an unnecessary added expense. The small amount of ammonia substantially increases the friability of the sulfur particles and aids in the production of seed particles in the bed.

In operation, liquid sulfur is introduced into the bed of tumbling particulate sulfur. It is preferred to introduce the sulfur into the tumbling bed of particulate sulfur in the form of a spray or curtain to coat the particulate sulfur with a thin coat of liquid sulfur. The tumbling and rolling action of the particles in the bed exposes all surfaces of the particles to the liquid sulfur and aids in providing a more or less uniform coating of liquid sulfur on the particles. The tumbling and rolling action of the bed continually raises particles from the interior of the bed to the surface so that they can be coated with the liquid sulfur.

Since the temperature of the bed is maintained below the freezing point of sulfur, the liquid sulfur solidifies on the sulfur particle as the individual particle is tumbled or rolled in the bed.

The temperature of the tumbling and rolling bed of particulate sulfur is maintained below the freezing point of sulfur by heating and vaporizing water. The amount of water provided to the bed can be controlled to maintain the bed temperature in the range required to provide a product with a required moisture content. In general, as the bed temperature is maintained at lower levels, the product particulate sulfur contains increasing quantities of water. However, as the bed temperature is reduced, the capacity of the equipment for freezing sulfur increases and the particle size of the product tends to decrease. Air or other inert gases can be moved through the apparatus to produce a drier product at lower temperatures.

The water can be provided to the tumbling bed in the form of a spray, thin curtain, open pipe or intermixed with seed particles or nuclei entering the bed.

The preferred method for providing water to the bed is dependent upon the moisture content required in the product, continuous or batch operation and the method of providing seed particles in the bed.

When a substantially dry product is required, that is, when the bed is maintained at an elevated temperature, it is preferred to provide the water to the bed in the form of a fine spray, thin curtain or mixed with the seed particles entering the bed. If a product containing a substantial amount of moisture is suitable, water can be provided by any means capable of delivering a sufficient amount of water to the bed to maintain water in the bed. If the amount of water mixed with the product particulate frozen sulfur is not critical the addition of water to the bed need not be closely controlled. Periodic addition of a sufficient amount of water to maintain the bed wetted will suffice.

Water is not generally occluded in the sulfur particle. Water droplets which may be on the surface of the sulfur particle prevent the liquid sulfur from sticking to the solid particle and provide a weak section in the coating which can be broken off by the tumbling and rolling action of the sulfur particles in the bed. Providing a wetted bed of sulfur particles is a method of generating seed particles or nuclei in the bed. When the bed contains a substantial amount of water, the sulfur pellets remain relatively cool and can have droplets of water adhering to the surface of the particle. When the cool wet particle is contacted with liquid sulfur, the sulfur quickly freezes. The droplets of water provide areas on the pellets where the coating of liquid sulfur does not stick to the previously formed solid particle. The weak spot is cracked and broken off by the rolling and tumbling of the particles in the bed. The small fragments which are broken off in this manner provide seed particles which are nuclei for coating by the liquid sulfur.

Small particles of particulate sulfur (seed particles or nuclei) can be provided to the bed by means such as crushing oversized or product particles which are formed in the bed and returning the crushed particles to the bed, addition of particulate sulfur from any source, addition of ceramic, stone or metal balls to the bed to fracture particles or to become coated with sulfur which is broken off by collision in the bed, chains hanging in the apparatus positioned to strike the walls or operating a wet bed. A preferred embodiment of the invention provides a wet bed to form seed particles which are transferred to a bed operating at a higher temperature to form a substantially dry product.

Preferably, the operation is carried out in a rotating drum arranged with its axis disposed substantially horizontally. The drum is rotated continuously at a speed wherein the mass of sulfur particles contained therein are caused to ascend at the rising side of the drum and then to tumble and roll downwardly so that they are in condition of continual but variable movement. Methods for providing tumbling action to a bed of particles are well known in the art. The liquid sulfur is preferably directed at a point near the ascending portion of the tumbling bed. The water is preferably admitted at a point near the lower part of the bed so that the particulate sulfur coated with the liquid sulfur tumbles or rolls down the outside of the moving bed and is contacted at the lower portion with water. The drum is rotated at a speed which is sufficiently high to cause the particulate sulfur to tumble, similar to the balls in a ball mill rather than merely sliding within the rotating apparatus.

In a continuous operation, as the liquid sulfur is added to the tumbling bed of particulate sulfur and the liquid sulfur hardens, the level of the particulate sulfur in the rotating drum increases. When the level of particulate sulfur has increased to the point that it is above the discharge point, the pelletized sulfur begins to flow out of the tumbling bed. If sulfur pellets with a particle size in a relatively small range are desired, the sulfur which is being discharged from the rotating drum can be passed over a separation means such as a screen which separates the particles into particular particle size ranges. The oversize can be crushed and returned to the bed along with the undersized particles as seed or nuclei for coating with liquid sulfur.

If substantially dry particulate sulfur is required, water in the form of a fine spray can be admitted to the bed at a controlled rate to maintain the temperature of the particulate sulfur in the bed at above about 70°C. and preferably from about 80° to about 110°C. When the particles in the tumbling bed are maintained at the elevated temperatures, they rapidly dry on discharge and sulfur containing less than 0.15% moisture can be produced. Air can be introduced into the apparatus to aid in producing a substantially dry particle. As used herein substantially dry refers to particulate material containing less than about 0.5% water by weight measured after the particle has cooled to ambient temperature exposed to the air.

When a layer of water is maintained in the bottom of the rotating apparatus, a considerable amount of water is incorporated in the tumbling pellets and a frozen sulfur product containing above about 0.5% moisture is obtained. If a particulate sulfur product containing levels of moisture above about 0.5% are suitable, the process can be readily operated with little control by maintaining a small amount of water in the bottom of the rotating drum or periodic additions of water to the bed to insure that the bed is wetted.

The moisture incorporated in the bed of tumbling particles produces nuclei by forming weak spots where the liquid sulfur is not bonded to the surface of the solid particle. By operation in this manner the tumbling bed of particulate sulfur does not require the addition of nuclei or seed particles to maintain a large number of small particles in the tumbling bed.

If the tumbling bed does not contain sufficient water or other means to provide seed particles, seed particles must be provided to the bed from an external source. If nuclei or seed particulate sulfur is not provided in the bed, the tumbling particles simply grow larger and particles in the size range of 1 to 4 inches in diameter can be produced by the process. It is preferred, however, to produce particles in the range of from about one-eigth to about 1 inch and preferably from about 3/16 to about three-fourth inch in diameter. Particles in this size range are readily handled by many types of solids handling equipment.

The invention will be further described by a reference to the drawings.

FIG. 1 is an illustration of an apparatus for carrying out the process of the invention. FIG. 1 shows rotating drum 10 which is of relatively large diameter in relation to its length. Rotating drum 10 is supported by shaft 7 carried on bearings 8 supported by pedestals 11 mounted on base 15. Shaft 7 has pulley 12 mounted thereon which is rotated by motor 14 which operates belt 13 in contact with pulley 12. The drum is rotated at a speed to impart a tumbling and rolling action to the particles in the drum. The speed of rotation necessary to maintain tumbling action in the bed of particulate material is related to the diameter of the drum and the depth of the bed of material in the drum. In general, larger diameter drums operate at lower rotational speeds. As the level of pelletized or particulate sulfur builds up in the drum, the particulate sulfur overflows through skirt 9 over grizzly screen 4 which separates the oversized particles from the particles in the desired size range. The particles which pass through grizzly screen 4 enter screw conveyor 5 and are carried away by the rotation of screw member 6. Oversized particles can pass to crushing means not shown and be recycled to the bed.

When a substantially dry sulfur is desired, particulate sulfur can be added to rotating drum 10 through particulate sulfur feed means 3. A sufficient amount of particulate sulfur is added to the bed to insure that the particle size which overflows skirt 9 in drum 10 is in the desired particle size range. When substantially dry sulfur is required, the temperature of the particulate sulfur overlflowing drum 10 through skirt 9 is maintained above about 70°C. and preferably from about 80° to about 110°C.

The liquid sulfur is admitted to the tumbling bed of particulate sulfur in drum 10 by means of liquid sulfur inlet 1 which is a steam jacketed pipe adapted to maintain the sulfur in the liquid state and which terminates in a spray nozzle which provides a square spray pattern of liquid sulfur. The spray is adjusted to wet the surface of the tumbling particulate sulfur over substantially the entire width of the rotating drum. The liquid sulfur is admitted to the tumbling bed of particulate sulfur near the upper end of the piled up sulfur which accrues in the direction of rotation of the drum.

The particulate sulfur is contacted with liquid sulfur while tumbling down the bed. The tumbling action exposes different portions of the particle to the spray of liquid sulfur and tends to distribute the liquid sulfur as a more or less even thin coating on the surface of the particles. Near the lower portion of the pile the tumbling particles are contacted with a fine spray of water. The water is admitted through inlet line 2 and contacts the bed in the form of a fine spray of mist through a spray nozzle 22 which may be gas atomized. The rate of addition of the water is controlled to maintain the temperature of the particulate sulfur in the bed in the desired temperature range. That is, above about 60°C. and preferably from about 80° to about 110°C. when substantially dry sulfur pellets are required. Air can be admitted to the apparatus through air line 16.

If it is not necessary to produce a substantially dry sulfur the water spraying nozzle can be replaced with an open pipe water inlet sufficient to provide a wetted bed or a small amount of water in the bottom of rotating drum 10. When the tumbling bed is wetted or there is water in the drum the liquid sulfur rapidly solidifies on the surface of the relatively cool particles. The rotation of the drum tends to incorporate a substantial amount of water in the tumbling bed if water is present in the drum. The water is carried along in the interstices between the sulfur pellets.

The small seed particles or nuclei can be provided to the bed by chains hanging in the rotating drum or by incorporating into the bed ceramic, stone or metal balls or pieces which by the rolling and tumbling action cause attrition of some of the particulate material. The balls can become coated with sulfur and the coating broken off by collisions between the balls.

Figure 2:
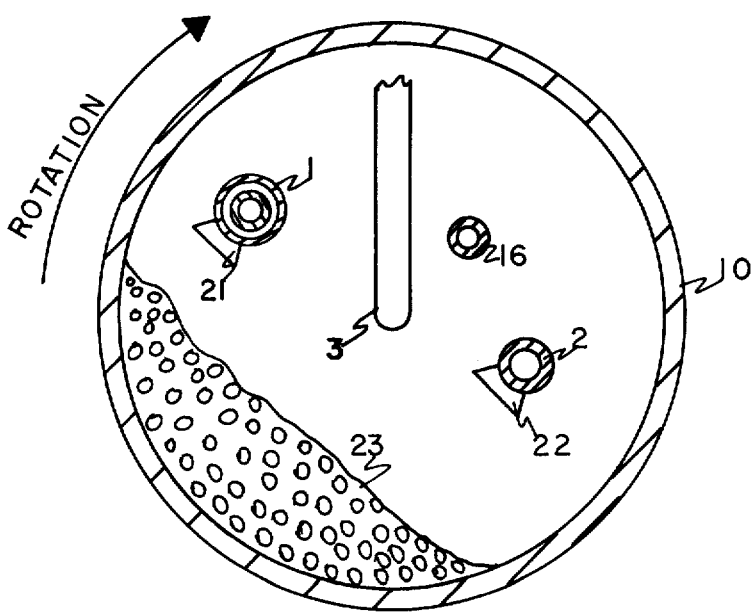

FIG. 2 illustrates the position of air inlet 16, sulfur spray nozzle 21 attached to sulfur inlet line 1, particulate sulfur inlet 3 and water spray nozzle 22 attached to water inlet line 2 in relation to the rotation of the drum and the tumbling bed 23. As stated previously, if a small layer of water is maintained in drum 10 a spray nozzle or means for dispersing the water over the surface of the tumbling bed need not be utilized.

The temperature of the tumbling bed can be monitored by means of infrared detectors, thermocouples which pass through the tumblinb material or by thermocouples which measure the temperature of the material which overflows the bed. It is also possible to judge the temperature of the bed by the appearance of the tumbling particles. The particles change from a yellow color to an orange color as the bed temperature increases. The bed temperature is important in insuring that the temperature is below the freezing point of sulfur or where it is necessary to maintain the temperature in the range required to produce a substantially dry product.

Figure 3:
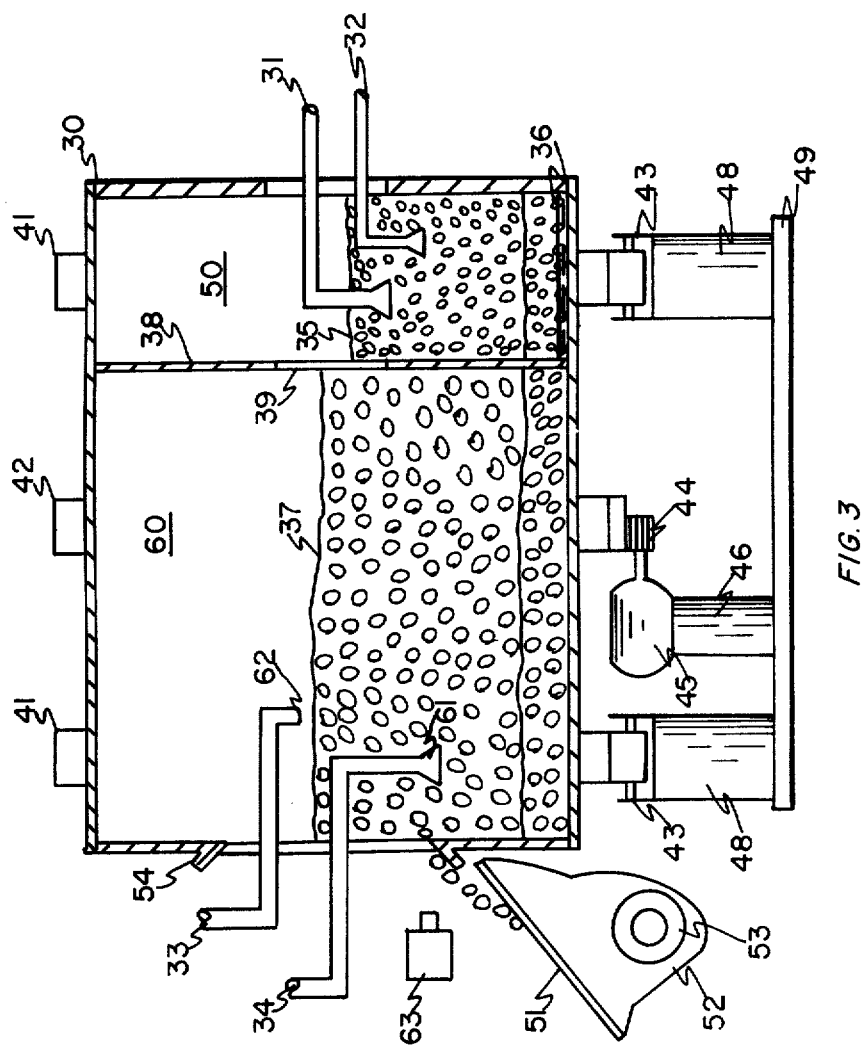

The process of the present invention can be carried out in an apparatus shown diagrammatically in FIG. 3.

FIG. 3 shows rotating drum 30, which rotates about the horizontal axis (not shown), supported by riding rings 41 which ride on trunnions 43 supported by supports 48 on base 49. The rotating drum is rotated by means of drive assembly 45 which engages girt gear 42, through gear 44. The drive assembly is supported on base 49 by support 46. Rotating drum 30 is separated into two compartments by baffle plate 38 which has opening 39 cut therein to permit flow of particles from bed 35 to bed 37.

In operation bed 35 in compartment 50 is maintained wet or a small amount of water 36 can be maintained in the bottom of compartment 50 by means of admitting water to the rotating bed through water inlet 32. As the drum rotates, the particulate sulfur contacts the water and the wet particles of sulfur are carried along with the rotation of the drum. Liquid sulfur is admitted to compartment 50 near the upper portion of the bed. The wet or damp sulfur particles contact the liquid sulfur and the liquid sulfur solidifies. Due to droplets of water adhering to the sulfur particles in the wet bed, the sulfur does not adhere to the solid particles over the entire surface. The tumbling action which occurs in the bed as the drum rotates causes the non-adhering portion of sulfur to break off and provide nuclei or small seed particles for maintaining a small particle size in the bed.

As the level of the sulfur particles in compartment 50 builds up, the particulate material overflows through opening 39 in partition 38 into compartment 60. The particles in tumbling bed 37 in compartment 60 are maintained at a temperature above about 60°C. but below the freezing point of sulfur and preferably above about 80°C. but below about 110°C. The bed temperature in compartment 60 may be controlled by adjusting the liquid sulfur feed rate to a rate sufficient to remove the water carried with the particles entering compartment 60 from compartment 50 without additional water feed to bed 37 to provide a substantially dry product. Additional water can be introduced into bed 37 in compartment 60 through fine spray nozzle 61 attached to water inlet line 34. The particles which have overflowed from compartment 50 to compartment 60 are rapidly dried by contact with the tumbling bed of heated particles. Air can be admitted to compartments 50 or 60 through an air inlet line not shown.

Sulfur is admitted to tumbling bed 37 and compartment 60 through steam jacketed sulfur inlet line 33 and spray nozzle 62 which is adjusted to provide a square spray pattern to spread the sulfur over substantially the entire width of the tumbling bed. The spray is located in such a manner as to direct the liquid sulfur to a point near the highest point in the bed so that the sulfur particles become coated with liquid sulfur as they tumble down on the top of the bed as the drum rotates.

Water can be admitted through inlet line 34 and spray nozzle 61 which provides a fine spray of water controlled to maintain the bed temperature at above about 70°C. When a substantially dry product is to be produced at low temperatures a gas (preferably air) is advantageously admitted to the apparatus to lower the partial pressure of water vapor in the atmosphere in contact with the tumbling particles. The temperature of the bed can be monitored by infrared monitoring device 63 which monitors the temperature of the particles which overflow from compartment 60 over skirt 54. The particles which overflow bed 37 in compartment 60 pass onto grizzly screen 51 which separates the oversized particles from particles in the desired size range. The particles which pass through grizzly screen 51 fall into screw conveyor 52 and are conveyed away by rotation of screw 53. The oversized particles can be collected in a hopper now shown, crushed and returned to the bed if desired. The oversized particles can also be remelted and returned as liquid sulfur to the tumbling bed.

Oversized sulfur particles tend to segregate at the bottom of the bed and lifting vanes in the form of bars welded parallel to the axis of the rotating drum between the outer wall and partition 38 can be so-spaced as to permit particles to fall therebetween but carry oversized particles to the top of the bed where they are discharged from the compartment.

The invention will be illustrated by reference to the following examples.

EXAMPLE 1

A rotating drum such as illustrated in FIG. 1, 3 feet in diameter by 1 foot long was utilized in the experiment.

The outer face of the drum is a ring 3 feet OD × 2 feet ID. The ring retains a bed of sulfur 6 inches deep in the rotating drum. A short section of 45° cone is attached to the ring matching the ID and forming a discharge shute or skirt. The drum is rotated about the horizontal axis at 13 rpm. to provide the tumbling action to the particulate bed of sulfur.

Sulfur is fed to the bed through a steam jacketed line to a Spraying Systems Company spray nozzle number ⅜ HH 18 SQ. with a spray orifice of 5/32nds of an inch. The spray nozzle has the following characteristics for water:

| Pressure (psig.) | Capacity | Spray Angle |
|---|---|---|
| 5 | 1.3 G.P.M. | — |
| 7 | 1.5 G.P.M. | 71° |
| 10 | 1.8 G.P.M. | — |
| 20 | 2.5 G.P.M. | 75° |

The spray nozzle has a square spray pattern so that a fairly uniform distribution of sulfur across the tumbling bed is provided. The spray is adjusted so that the sulfur is applied over a broad band in the direction of tumble. The particles in the bed have an opportunity to be rotated and thus coated on all sides. The spray is adjusted to extend within 2 inches of the sides of the tumbling bed. The flow of sulfur to the spray nozzle is controlled by a jacketed ball valve. The head of sulfur available to the spray nozzle is approximately 30 feet.

Water is applied to the bed by atomization through a paint sprayer in the form of a fine mist. Eight 1 inch by ⅛ inch steel strips are welded across the cylindrical section of the pan parallel to the axis to prevent the bed from sliding along the surface of the drum.

Particulate sulfur is added to the drum. The rotational speed of 13 rpm's is determined by observing the tumbling action of the particulate sulfur. Drum rotation is started and sulfur is introduced through the square spray nozzle onto the tumbling bed of particulate sulfur. Water is introduced as a fine mist through the paint sprayer. Sulfur is added at a rate which does not cause buildup on the pan. The temperature of the bed as measured at the particles overflowing through the cone section was maintained between 75° and 105°C.

The initial particle discharge is fairly uniform roughly spherical particles smaller than one-fourth inch in diameter. As the run continues for several hours, the tumbling mass becomes progressively coarser until the average particle size is about 3 inches in diameter.

There is insufficient attrition and breakage of the lumps in the bed to form seed material on which fresh particles can grow. As the particle size increases, the freezing surface is reduced. It becomes necessary to reduce the sulfur feed rate until the spray nozzle can no longer produce a spray. In order to produce a uniform particle size solified sulfur particle, it is necessary to provide particulate sulfur or seed to the bed. Particles grow on the seed particles as product is removed from the tumbling bed.

EXAMPLE 2

The rotating drum utilized in Example 1 is emptied of the large particle size sulfur and refilled with particulate sulfur less than one-fourth inch in diameter. The paint sprayer is removed. Water is introduced into the drum with a garden hose without a spray nozzle. The drum is rotated and the tumbling mass rapidly incorporates the water into the bed. Liquid sulfur is admitted to the bed through the spray nozzle. The bed is wetted and water is added periodically in accordance with the appearance of the bed. Sufficient water is added to maintain the color of the bed; a bright yellow. The bed is wet and has good heat removal characteristics. It is possible to use a maximum sulfur spray rate, that is, the capacity of the sulfur nozzle utilized in Example 1 with the full 30 feet of sulfur head.

The pellet size remains stable and no buildup is experienced on the drum. The rate of freezing sulfur exceeds 1000 pounds per hour. The sulfur product contains more than about 1% water by weight.

EXAMPLE 3

The addition of water as in Example 2 is discontinued. The sulfur addition to the bed is continued. When the bed temperature reached 85°C. the damp product produced in Example 2 is added to the bed at a rate to maintain the bed temperature between about 70° and 110°C. Random samples of product are taken and placed in cooled jars and it is noted if water condenses on the inside of the jar as the product cools. Samples are taken wherein no water condenses on the jar as the jar is cooled. A sample which shows no condensation in the jar is dried in an oven overnight at 75°C. The sulfur is found to contain 0.128% by weight water.

A sample in which condensation occurs on the jar as the product is cooled is dried overnight at a temperature of 75°C. The weight loss of the sample is 0.56%.

The product has a size range of from about one-fourth to about three-fourths inch in diameter. The bulk density of the product is 67 pounds per cubic foot.

EXAMPLE 4

The rotating drum utilized in Example 3 is emptied of about one quarter of the bed and the sulfur replaced by 1 inch diameter steel balls. The water is admitted to the bed by means of the paint sprayer used in Example 1.

The process is operated as in Example 1. The size of the particles in the bed remains stable. The sulfur feed rate is not reduced due to an increase in the size of the particles in the bed.

What is claimed is:

1. A process for preparing free flowing solid sulfur particles comprising:
    a. tumbling a bed of solid sulfur particles;
    b. introducing molten sulfur into said tumbling bed to distribute and provide a coat of molten sulfur on the surface of said solid sulfur particles;
    c. introducing an amount of water into said bed to cool and solidify the molten sulfur coating on said solid sulfur particles to thereby form free flowing coated sulfur particles;

d. removing said free flowing substantially dust free coated sulfur particles from said bed.

2. The process of claim 1 wherein an amount of said water is introduced into said bed to maintain the temperature of said bed between about 70°C. and the freezing point of sulfur.

3. The process of claim 1 wherein said water is introduced into said tumbling bed in the form of a spray to maintain the temperature of said tumbling bed between about 80° and about 110°C.

4. The process of claim 1 wherein the temperature of said tumbling bed is maintained below the freezing point of sulfur by introducing sulfur particles wetted with water into said tumbling bed of sulfur particles.

5. The process of claim 1 wherein sulfur particles wetted with water are introduced into said tumbling bed and additional water in the form of a spray is introduced into said tumbling bed.

6. The process of claim 1 wherein the temperature of said bed is maintained below about 100°C. by introducing a sufficient amount of water into said bed to maintain the bed wetted with water.

7. The process of claim 1 which comprises
 a. introducing a sufficient amount of water into said tumbling bed of sulfur particles to maintain said bed wetted with water;
 b. transferring said sulfur particles wetted with water to a second tumbling bed of sulfur particles;
 c. introducing an amount of molten sulfur into said second tumbling bed to distribute and provide a coat of molten sulfur on the surface of said solid sulfur particles and to maintain the temperature of said bed of sulfur particles above about 80°C. and below the freezing point of sulfur to form substantially dry and dust free, free flowing, coated sulfur particles;
 d. removing said substantially dry and dust free, free flowing, coated sulfur particles from said second bed.

8. The process of claim 7 wherein additional water is introduced into said second tumbling bed of sulfur particles.

9. The process of claim 1 wherein a stream of air is introduced into the means for tumbling the bed of sulfur particles to provide additional cooling and to reduce the partial pressure of water vapor in the means for tumbling the bed of sulfur particles, whereby drier particles are produced at a lower temperature.

10. The process of claim 2 wherein a stream of air is introduced into the means for tumbling the bed of sulfur particles to provide additional cooling and to reduce the partial pressure of water vapor in the means for tumbling the bed of sulfur particles, whereby drier particles are produced at a lower temperature.

11. The process of claim 7 wherein a stream of air is introduced into the means for tumbling the second bed of sulfur particles to provide additional cooling and to reduce the partial pressure of water vapor in the means for tumbling the second bed of sulfur particles, whereby drier particles are produced at a lower temperature.

12. The process of claim 2 wherein crushed sulfur, of a particle size smaller than the sulfur particles recovered from said bed, is added to said bed and coated with the molten sulfur.

13. The process of claim 1 wherein from about 5 to about 100 parts per million, based on the weight of sulfur, of ammonia is introduced into said tumbling bed of sulfur particles, during the addition of molten sulfur, to reduce the toughness and resiliency of the particles.

* * * * *